US007284931B2

(12) United States Patent
Stratford

(10) Patent No.: US 7,284,931 B2
(45) Date of Patent: Oct. 23, 2007

(54) MAGMA EVACUATION SYSTEMS FOR THE PREVENTION OF EXPLOSIONS FROM SUPERVOLCANOES

(76) Inventor: Brian Stapleton Stratford, 40 Field Ris, Little ver, Derby DE23 1DE (GB)

( * ) Notice: Subject to any disclaimer, the term of this patent is extended or adjusted under 35 U.S.C. 154(b) by 0 days.

(21) Appl. No.: 10/230,549

(22) Filed: Aug. 29, 2002

(65) Prior Publication Data

US 2003/0145592 A1 Aug. 7, 2003

(30) Foreign Application Priority Data

Feb. 4, 2002 (GB) ................................. 0202465.1

(51) Int. Cl.
*E21B 36/00* (2006.01)
*E21B 43/24* (2006.01)

(52) U.S. Cl. .................. 405/131; 405/258.1; 405/303; 166/302; 166/57

(58) Field of Classification Search .................. 405/52, 405/258.1, 130, 131, 303; 165/45; 166/302, 166/304, 57–62

See application file for complete search history.

(56) References Cited

U.S. PATENT DOCUMENTS 3,115,194 A * 12/1963 Adams ........................ 376/273
3,357,505 A * 12/1967 Armstrong et al. ............ 175/16
3,396,806 A * 8/1968 Benson ......................... 165/45
3,693,731 A * 9/1972 Armstrong et al. ............ 175/16
3,957,108 A * 5/1976 Van Huisen .................. 165/45
3,967,675 A * 7/1976 Georgii ....................... 166/302
3,991,817 A * 11/1976 Clay ............................ 165/45
4,134,462 A * 1/1979 Clay ............................ 175/16
4,776,169 A * 10/1988 Coles, Jr. ..................... 165/45

FOREIGN PATENT DOCUMENTS

| GB | 2362410 | 11/2001 |
|---|---|---|
| JP | 070071020 A | 3/1995 |
| JP | 100076104 A | 3/1998 |
| JP | 100077952 A | 3/1998 |
| JP | 100078497 A | 3/1998 |

* cited by examiner

*Primary Examiner*—Tara L Mayo
(74) *Attorney, Agent, or Firm*—Woodard, Emhardt, Moriarty, McNett & Henry LLP

(57) ABSTRACT

An apparatus controls the evacuation of volcanic magma to prevent explosions. Magma evacuation is through a single evacuation tube that heats the magma flow within the tube to prevent stickiness of the magma in the tube. The heating may use small combustion chambers to heat steam, which in turn heats and stabilizes the magma flow. Stability is aided by central cooling, where needed, using water jets from nozzles located at the wall of the tube.

25 Claims, 2 Drawing Sheets

MAGMA EVACUATION SYSTEMS FOR THE PREVENTION OF EXPLOSIONS FROM SUPERVOLCANOES

FIELD OF THE INVENTION

This invention relates to improved magma evacuation systems for the prevention of explosions from supervolcanoes and volcanoes.

BACKGROUND OF THE INVENTION

A Recently Discovered Global Danger from a Supervolcano

The introductory Sections 1 and 2 are based freely on a recent Patent Application, No: GB 0121244.8, published GB 2362410, by the present writer.

Many "ordinary" volcanoes could be dangerous. For example, it is well known that the city of Naples could be in danger if there were an eruption of Vesuvius. Another situation, on an altogether different scale, was highlighted recently on television:

A BBC Horizon programme described the discovery of a quiescent volcano under the U.S. Yellowstone National Park. At the time of writing there is a full transcript of the programme, together with some relevant discussions and links, available at the BBC Web Site.

The Yellowstone type of volcano is referred to as a "supervolcano".

The recent showing of the programme was a 'repeat'—on April $1^{st}$! However, there seem no other suggestions of programme makers' humour and the original showing was in February 2000.

One may conclude that we need a method for preventing the explosion of supervolcanoes and volcanoes.

Readers who would like to know more of the background of volcanoes would find the BBC book "Earth Story", by Simon Lamb & David Sington, 1998, very informative. The Yellowstone feature happens to be included in the map of page 108. The BBC web site also gives a lot of background, as does the "ScienceNet" web site.

The writer is pleased to acknowledge a very helpful private discussion with Prof. Steve Sparks of Bristol University. The writer has also had stimulating correspondence from Dr. Lyndon Ellis, patent examiner. Prof. Sparks and Dr. Ellis, however, are not in any way responsible for errors or unreasonable proposals by the present writer.

The writer suggests that the proposals put forward in the GB Patent Application mentioned above should make it possible to prevent supervolcanoes and volcanoes from exploding. However some of the techniques could have been very very difficult, even though justifiable for a purpose such as solving the possibly indicated Yellowstone situation. The further proposals being put forward now are in order to improve and greatly simplify the method. The work that would be involved now should be comparable with that in other very large, but otherwise more ordinary, engineering projects.

The Causes of Volcanic Explosions

At the centre of a volcano is volcanic magma. The volcanic magma is a hot liquid rock that can contain a large quantity of dissolved gas. It is the combination of hot liquid and a large amount of dissolved gas, bottled up, which presents the problem.

The magma at Yellowstone is in a huge reservoir, which reaches upwards, from great depths in the earth, to within about eight kilometres of the earth's surface. The magma is formed at the bottom of the reservoir. The extremely high pressures and temperatures that exist at the bottom of the reservoir force gas to dissolve in the rock. The magma forms continuously at the bottom of the reservoir and then, broadly speaking, moves slowly upwards through the chambers of the reservoir. However, great pressures are still needed to keep the gas in solution. Consequently, a large weight of overlying rock is needed to keep the magma and the magma gas "bottled up".

When movements occur in a particular volcano such that the weight of the overlying rock ceases to be sufficient to keep the magma gas in solution, the gas comes out of solution, it lifts the overlying rock—and escapes. The gas release may then spread through the chamber containing the magma so rapidly that it causes the explosion. The gas release and explosion continue until sufficient of the overlying and surrounding rock falls in and blankets the remaining magma.

It would seem that the explosion can perhaps be started even if the initial lack of weight from the overlying rock occurs only very locally in one fairly small part of the volcano, such as at a fault in the overlying rock. Once the local rock moves and some magma disintegration occurs, the disintegration may be able to spread across the magma field from that local starting position before the overlying rock has time to descend and blanket the magma beneath it.

A part of the high intensity of a magma explosion is caused by the fact that the exploding gas contains the disintegrated hot magma as a distributed suspension of particles. The particles are fine, so that their large reservoir of heat is instantly available for continuously reheating the expanding gas. Heating of the expanding gas increases its pressure, compared to an expansion without heating, rather as in the cylinder of a car engine.

Preliminary Discussion on Magma Removal for the Prevention of Volcanic Explosions If very large quantities of the hot explosive magma are removed from the chamber of the Yellowstone supervolcano, one might expect the explosion to be prevented. The supervolcano with its reduced remaining quantity of magma would tend, in rather general terms, to reproduce the situation of earlier stages in the present cycle of the volcano. The magma level in those earlier stages would have been lower in the magma chamber than now, with the overlying rock settled further into the chamber, so that the magma could have been more "bottled up" than now. Now, presumably, with the magma level and the overlying rock both higher, the cork is closer to being blown. At those earlier stages the non-explosive life to come was greater than now and the safety margin presumably greater than now—although that must to some extent depend upon the shape of the chamber. Moreover, as a bonus with magma removal, the magma that is removed would be degasified in a process plant and would probably be placed in a smooth layer on top of the overlying rock, choosing first the areas most in need of a distribution of ballast. Such general arguments need analysis. For present purposes, however, they are taken to justify the consideration of proposals for magma removal.

As a matter of safety it is assumed as for the previous Application that any proposals with serious support for action would start with very substantial analysis. That would include theory, laboratory tests, and work in the field. It would only be after such thorough analysis, followed by good follow-up experience, that new techniques would be applied on larger volcanoes, or in populated areas.

Great care would need to be taken with magma removal in several respects. Care would be needed mechanically not to disturb unduly the overlying rock in the removal region, so as not to introduce faulting or worsen existing faults. Likewise, heating from the hot evacuation flow may not be acceptable if that led to weakening either the overlying rock, or the cooler magma immediately below the overlying rock. Care would also be needed not to displace magma outwards from the operating region, particularly during the initial setting-up process, in order to avoid lifting the overlying rock at positions away from the operating position. There is a further item, additional to the previous discussion, of perhaps not allowing mixing or heat transfer under certain circumstances between hot and cold magma. That, it seems, could cause problems from earlier concentration of the magma gas in the crystals of the cooler magma.

However, there is now a very large simplification compared with the previous Application. At that time it was emphasized that there would be a very large amount of preparation for robotic working for the previous method. For the present method that does not seem to be so. At present it seems to the writer that, with the present proposals, the operations would be much easier than before and that robotic work would not seem to be necessary. The work required for preparing and operating the system may now be much more like that of other, very large, but otherwise ordinary, engineering projects.

Two Possible Basic Techniques for Use in Magma Evacuation Tubes

Preliminary—at Yellowstone the Evacuation Probably Needs to be at High Speed

Given the very large plan area of the magma chamber at Yellowstone, as well as its depth, then for any evacuation of the volcanic magma to be effective in preventing an explosion the evacuation would probably need to be at high speed. The term "high speed" is chosen for use in any comparison with conventional rates of mineral extraction at a single extraction position.

The two suggested possible basic techniques are now described as summaries. Both techniques appear to give high speed and controlled evacuation of the magma, with delivery to a treatment plant. Both techniques use an "evacuation tube", with the entry to the tube positioned in the magma.

The Technique of Strong Cooling

The passage of the tube contains a throat. The throat is followed immediately by a sharp divergence, in which a cooling flow which is probably water is mixed with the magma flow. The water flow is very large and is sufficient to cool all the magma flow to a temperature low enough to remove its stickiness. That prevents the magma becoming glued to the wall of the tube. The heat from the magma converts some of the water to steam, with the position of boiling dependent upon the magma to water mass flow ratios. The upward flow evacuation tube forms one limb of a "U-tube", with the supply pipes that carry the downward flow water providing the other. The steam content on the up side of the U-tube then provides the drive. As a result, there is a high speed upward flow of water and steam, with the water carrying the magma to the surface. There is a gradual divergence of the passage area for most of the distance up to the ground surface level.

From studies since the previous Application it seems that the stability of the very long length of mixed flow can be maintained by concentrating the steam near the wall of the evacuation tube and the water near the centre line. That situation is obtained by injecting small amounts of additional coolant water at successive heights at or near the centerline, while simultaneously providing a small amount of low grade heating at the wall. The low grade heating is obtained by surrounding the evacuation tube with an annulus flow of steam and water.

The Technique of Heating

Suppose one considers the situation without the strong cooling that is discussed above from the first Application. If there were no intentional strong cooling, the evacuation of volcanic magma from Yellowstone could possibly involve the hot volcanic magma flowing in an artificial passage that may be considerably longer than 8 km. The 8 km is the approximate estimate of the thickness of the overlying rock. A large fault of substantial cross-section could shorten the distance required for the tube, but there may be reluctance to use the fault for the evacuation, in case the heat from the magma flow weakened the system of structure of the overlying rock. Moreover it may be necessary to place the magma offtake a significant distance into the chamber, again in order to avoid damage from the heat disturbance. Consequently the evacuation tube could be very long. If so, and even if the tube were generously insulated, the temperature of the magma flowing in the tube could gradually fall to a value at which the magma is becoming rather too viscous for the evacuation and rather too sticky. Motion through such an evacuation tube would seem likely to be both slow and difficult. It also seems rather likely to be unstable, somewhat as in natural volcanoes. The proposals of the previous Application were intended to be one way of overcoming the problem. Those proposals, as summarized above, were for strong cooling of the volcanic magma, sufficient, and in such a way, that the magma becomes reasonably hard and brittle, without stickiness, and in the form of solid particles, and then transporting it by a high speed fluid carrier.

BRIEF SUMMARY OF THE INVENTION

The present proposals now take the opposite route. The present proposals provide heat. The heat keeps the flow of volcanic magma in the tube sufficiently hot for the magma to be an adequately free running liquid—even after degasification. The "adequately free running liquid", moreover, is sufficiently free running for the drive part of the length of the tube to contain the magma in a mixed flow that is capable of being stabilised.

It is to be noted that the heat or heating provided by the present proposals may be termed "high temperature" heat or heating, as it makes hot volcanic magma hotter. The appropriate form of such heating would seem likely to be either combustion chambers or combustion torches, somewhat as in say liquid fuel rockets or gas turbine engines, or the heating could be electrical. It will be seen later in the discussion that very very hot steam could become an intermediary in the heating process. The term "high temperature heating" is intended to be in distinction from the heating say as suggested in The Technique of Strong Cooling, above, where an annulus flow of steam and water stabilises the main flow of steam, water, and strongly cooled magma, by relatively low grade heating through the wall.

According to the present invention there is provided a "hot volcanic magma evacuation tube" for the prevention of explosions from supervolcanoes and volcanoes, having means for heating some or all of the hot volcanic magma evacuation flow.

DETAILED DESCRIPTION OF THE INVENTION

A Likely Form of the Tube

Figure 1:
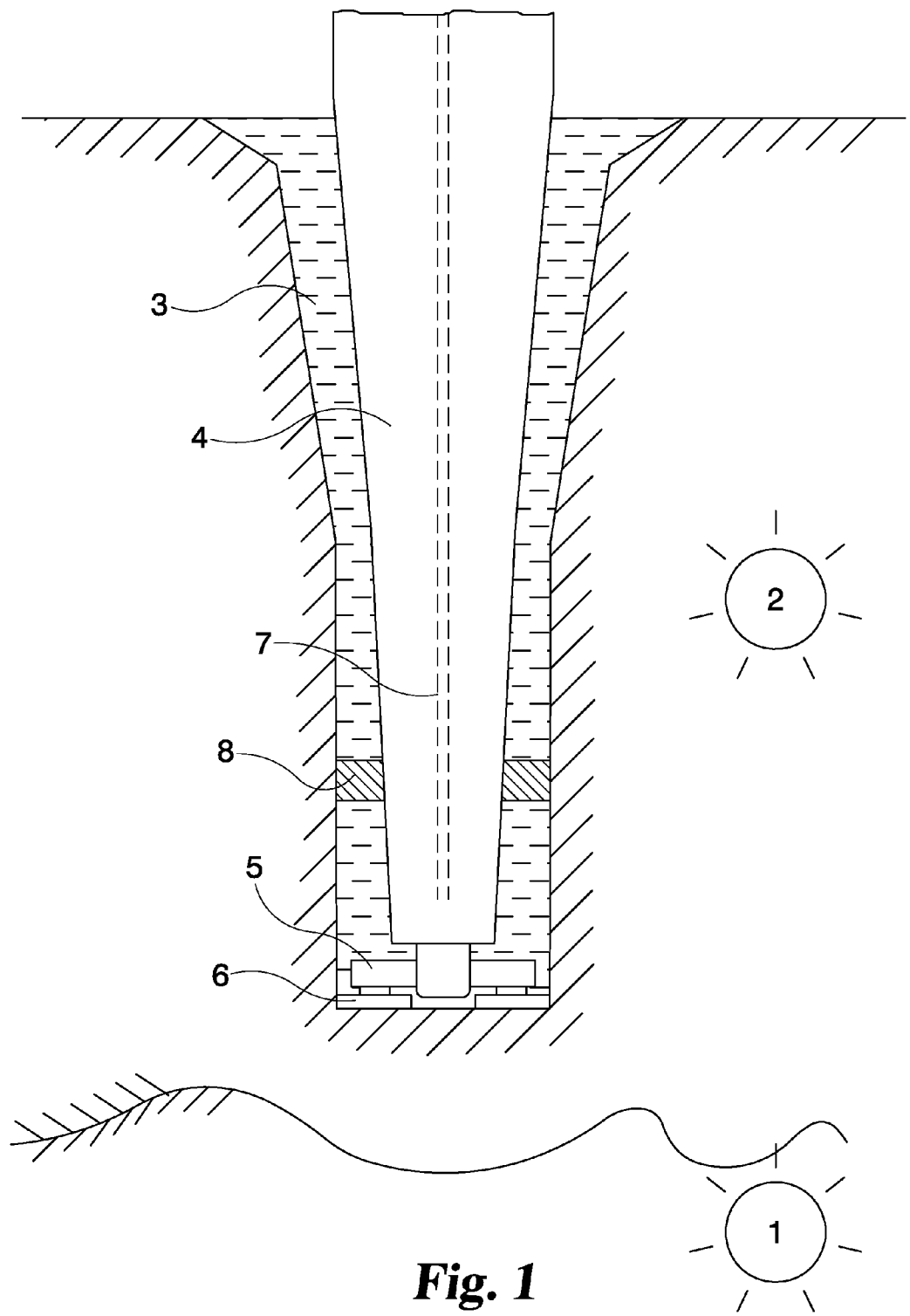
FIG. 1 is a cross-sectional view showing aspects of an excavation performed in accordance with the present invention.

In order to economize in the amount of heating, the magma may be allowed to cool somewhat during its flow through the lowest part of the tube—although even after that initial cooling the magma would still be very hot. There may then be a set of large vortex generators to invert the temperature profile, in order to bring the hottest flow into the region close to the wall, that region being where a low viscosity is of greatest importance. The heating may then start immediately after the vortex generators, or more probably slightly later in the flow. The heat would be added to the already hot flow of the volcanic magma from heating means that is probably at the edge of the magma flow, or within it, and at a position at or very near the wall of the tube. If within the flow, the heating means would probably be within say the outermost 10% of the flow cross-sectional area. Combustion torches or combustion chambers, electrical heaters, and injected gas, including possibly steam, seem the most likely means from which to choose, for providing the heat. If injected gas is the heating means it itself could have been heated locally, at a convenient position close to the position of injection. Insulation would be expected between the magma and the structural wall of the tube. The insulation may be in the form of overlapping tiles, in order to reduce problems of thermal expansion and in order that the overlap from one tile can protect the fixing of the adjacent tile. Correspondingly, cooling would be expected for some parts of the structural wall.

Drive and the Need for a Throat; Stability

As with the previous proposals there are requirements for both drive and stability in the flow in the tube.

For the Yellowstone situation, where the overlying rock is rather as if it were floating on the magma in the magma chamber, the pressure in the magma at the entry to the evacuation tube corresponds to the pressure head provided by the weight of the overlying material. If, therefore, we at first consider a static situation, and suppose also that the tube is open to the atmosphere at the ground level surface, and that the magma may be taken as a pure liquid, then the entry pressure would be able to drive the magma in the tube to a height about equal to the average altitude of the overlying rock surface level, after some correction for relative densities. Further drive would then be required to raise the magma in the tube the remaining distance, if any, to the local surface level, with further drive again to overcome the friction, and other dissipation, produced when the magma flow is at its required velocity, as well as to overcome any outlet restriction.

Now in fact we know from experience that the gases released from solution in the magma are capable under suitable circumstances of driving the magma to the ground level surface and to do so at very high speed. However, for the close control that is required for the present flow, it is taken as axiomatic that an entirely artificial drive should be available, even if it is capable of providing only a low performance. An example of when such a drive could be required would be a re-start of the system, after a switching-off may have caused a large amount of degasified material to fall back into the tube and blanket the active magma.

At least, the natural drive indicates a method that works, and one that works strongly with apparently only a small amount of gas. Consequently, an air flow is used for supplying the oxygen to the combustion torches, so that the same air flow, after its use for combustion, and after being supplemented as required, is used for artificially driving the flow.

Now the general structure of the evacuation tube would in some ways be similar to that of the previous Patent Application. In particular, the tube has two different regions, in order to ease the acceptance of the extreme ambient conditions at great depth. At great depth both the ambient temperature and the ambient pressure are very high. These conditions are made much more acceptable for engineering working, in the writer's assessment, by specifying that the wall of the tube in these extreme conditions does not have to hold more than a small or very small pressure drop across it. While in principle that could be consistent with a steady high internal velocity containing say a bubble drive, rather sharp transients in such a flow could cause problems. Consequently it seems highly desirable to arrange for there to be only low or very low internal velocities in the lower region of the tube, the region that is at great depth. Provided, then, that the magma temperature in the tube is high enough for the viscosity to be low, the tube at great depth could be a region of only small, or very small, pressure drop across the wall.

At the shallower depths the ambient conditions of both temperature and pressure are more readily acceptable for engineering working. Substantial pressure loading across the tube wall is therefore correspondingly more readily acceptable. Moreover, even with very high velocities in the tube, the reduced ambient pressures at the shallower depths mean that the compressive pressure drop across the tube wall would be much less than if similar types of flow extended to great depth. Consequently it seems likely that the engineering at the shallower depths would much more readily be able to provide the range of conditions needed to simulate erupting volcanoes in a controlled manner. The shallower region of the tube may therefore be expected to have to operate under a considerable range of pressures within the tube, from rather high speed evacuation to complete suppression, and correspondingly across the wall of the tube.

There are probably, therefore, two distinct parts to the tube. The lower part would accept probably only low velocities. The upper part would be designed to accept a wide variety of flow situations, dependent on whether the flow at one extreme has been closed down or whether at the other extreme the tube is flowing, at a small scale, and controlled, but rather like a natural volcano at full exhaust velocity. At the full exhaust velocity the static pressures in the part of the tube at the shallower depths could become not very much greater than the pressure in the tube at the ground level surface. These relatively low internal static pressures would need to be held back from penetrating into the lower part of the tube, as there they probably could cause a collapse. Holding back the pressures can be achieved by separating the two parts of the tube by a throat. The throat requires to be sufficiently small for the purpose. The static situation would also need to be assessed, for example to confirm that the magma gas pressure from a possible magma disintegration did not exceed the allowable pressures at any depth.

The main drive would be carried out after the throat. A very small flow of air or gas could give a drive by bubbles. A larger flow could convert the flow in the evacuation tube above the throat to be primarily an air or gas flow, with that flow acting as carrier for the magma, after the magma has broken up into liquid drops. The phrase "air or gas" is used to include the possibility that water may be easier to use than supplementary air for the drive. The supply seems likely to be simpler, but its conversion to steam would be pressure and heat dependent, so that its operation could be more complicated.

A possible instability in a natural flow would be for the higher temperatures and velocities, and the higher proportions of air or gas, to concentrate in the central region of the tube, while the lower temperatures, and the lower or the reversed velocities, and the higher proportions of magma, concentrate near the wall. That situation could lead to an almost pure air or gas flow rising at high speed in the central region, with all the magma running down the wall.

In order to achieve a stable controlled flow the wall is heavily insulated, the heating from the combustion torches is carried out close to the wall, hot gas is injected vertically upwards tangentially at the wall, while cold water is injected into the central region of the tube—probably from nozzles at or fairly close to the wall. It is then argued that that can produce a stable flow, with an inverted velocity profile, for either of the types of flow. For the bubble flow, it seems to the writer that the higher viscosity in the central region would tend to cause the bubbles to migrate outwards, where they would generate higher velocities and reinforce the migration outwards. Rather similarly, for the gas carrier flow, the high temperatures, with the pressure drop into and up the tube, would give high velocities close to the wall, correspondingly with low values in the central region. The enforced input temperatures tend to give the required velocity profile, while the gravitational load such as on the central magma concentration can confirm it. The distributions could be set up for the flow coming into the driving region from the throat perhaps by having a step expansion of the tube immediately after the throat and situating combustion torches and air or gas entry in the step.

Starting of the system must be possible. The system may start most readily working from the throat upwards when only air is being used for the drive, as the throat exit flow could start off with the required distributions. However, if the drive is largely from water heated to steam, starting may be easier working downwards from the ground surface level in order that the water can more readily boil. With either method it would probably help during the starting to have available an excess of the various capabilities—air, fuel, water and burner capacity,—with independent control for various depths, as well as a lot of instrumentation.

As a part of the control situation the exit at ground surface level may be into a chamber of controllable pressure. For example that would allow suppression of the magma disintegration if so desired. Flow of the magma would still be possible, at least at low speed, if say there were a great enough depth of bubble drive available.

An additional consideration when the magma is being carried at high speed in the form of liquid particles by the air, steam and magma gas is the deposition of magma onto the wall. For that consideration it is argued that, with the high temperature heating of the magma, the viscosity would be sufficiently low for the magma on the wall to behave as a liquid. It would then be driven by the high speed gas flow into waves, which would break, allowing the magma to be "scraped" off the wall by the high speed gas flow. The removal rate on such a mechanism would be expected to be able to match the rate of deposition, so keeping the wall clean and the flow stable. Consequently the flow appears to be stable on both of the potential instability mechanisms considered in this discussion.

Comparison of the Overall Performance Between the Technique of Strong Cooling and the Technique of Heating Broadly there seem to be four advantages from the use of high temperature heating.

The technique of strong cooling requires a very large flow of coolant for a given magma flow. Moreover, for the type of installation first envisaged in the previous Application, the magma throat could have been at a depth of perhaps 8 km. At that depth the ambient pressures and temperatures would have been high, while the coolant probably needed to be kept reasonably cool. Consequently even the design of the coolant supply could have been a very major project. In contrast, the heating technique seems likely to require only small supplementary flows.

For the second effect the depth of the throat needs further consideration. The 8 km depth for the magma throat was thought of in the previous Application as the "natural" position as being at the top of the magma chamber. However a much shallower throat is now being chosen. That choice is subject to confirmation that the natural pressure level at much shallower positions is much more than sufficient to prevent magma disintegration. Given that confirmation, the evacuation tube leading to the much shallower position would have heating of the magma to the extent necessary to maintain its liquidity and low viscosity. The shallower throat position seems to simplify the present technique of magma heating, as in the discussion of Drive and the Need for a Throat. On the same basis the shallower throat could be used for the technique of strong cooling. The strong cooling technique may therefore also have heating upstream of the throat. In that variation the strong cooling could loose much of its problem. Closer assessment between the two methods could then be required.

The third effect concerns the method of cutting the shaft, followed by installing the tube, and is therefore discussed separately as follows.

The Effect on Both the Cutting of the Shaft, and the Installation of the Evacuation Tube, of the Concept of Applying High Temperature Heating to Magma The third effect from the proposal of high temperature heating of the magma within the evacuation tube is in a use of the concept in a different situation.

Perhaps the major consideration with the proposals of the previous Application was the very large amount of complex robotic work required for the excavation of the shaft and the construction of the tube. It now seems possible to avoid such work. It is now proposed to proceed as follows.

The shaft is cut by milling cutters. These are on radial arms of adjustable length and are operated through a central column in an ordinary sort of way until the natural ground pressures start to become significant. The shaft that has already been cut at that stage is then filled with a suitable semi-liquid material. Magma that has been appropriately treated by degassifying, cleaning and then reheating, could be suitable. Specially selected sand, heated, and possibly treated, perhaps to something like a low melting point glass, may be simpler. "Sand" will now be used as a term to include all such possibilities. The purpose of the semi-liquid magma or sand is to pressurise the shaft to the natural level, and to do so automatically, without pressure bulkheads, while allowing the shaft cutting to proceed almost continuously, as well as almost directly from a ground level operating position. The magma or sand is therefore chosen to have a suitable density and to become semi-liquid at as low a temperature as possible. Almost the only movements required for the cutting operation would be a slow vertical movement of the central column and the machining actions at the cutting face. Controllable heating and probably cooling would be provided down the length of the shaft and in the vicinity of the radial arms. The cutters could be cooled by water jets and their effluent and the cut-away rock would be scavenged along with incidental magma or sand. The apparent weight of the cutting gear would be small because of the buoyancy from the magma.

If the sand were used in the cutting of the shaft, rather than the magma, an alternative to heating could perhaps be a fluidised bed. Water may then be more suitable than air for the fluidizing agent, especially as the air would change in specific volume with height. The large depth required may still allow the fluidizing action if the water were available for the fluidizing at frequent intervals of height, particularly during the starting process. However, the power required for a fluidised bed could be high. There could, moreover, be difficulty in matching in a reliable stable manner the required natural pressure distribution with height, particularly as the pressure distribution would be a permanent requirement. Heating will be assumed to be necessary for the rest of the discussion.

During the cutting of the shaft as discussed above the rock face of the shaft would be supported in a broad sense by the pressure of the warm or hot magma or sand. However, that must leave open possible requirements for thermal insulation of the rock face and further mechanical stabilisation. Such requirements would not be too simple to satisfy, even during the cutting operation. There could then be further difficulties for a permanent arrangement, as, from the arguments of the previous Application, it seemed that the shaft could suffer major distortions during the course of the subsequent main magma evacuation. In particular, the likely distortion could make it difficult to provide cooling within the rock face protection. As a result of considering these possibilities the position for the installation of the evacuation tube within the magma field has been reconsidered, as follows.

In the previous Application the correct choice for the position of the evacuation tube seemed to be at the most likely starting position for an explosion. That was partly on the very general sort of argument that that position had the greatest need. Such an argument now seems incorrect. The magma pressure at any given "altitude" within the magma chamber must be sensibly constant throughout the magma chamber. Consequently the explosion is presumably most likely to start at a position where the overlying rock is rather thin and where there is serious faulting. The thinnest layer of overlying rock was an added attraction for siting the evacuation tube in the previous Application because of the difficulties both of cutting the shaft and of installing the tube. Likewise if a fault has allowed the magma to rise up through the overlying rock, to a shallower depth, the same advantages would have applied. Nevertheless, cutting a shaft through a fault area is highly undesirable in terms of the stability of the shaft, from all points of view. In addition, areas where the overlying rock is thinnest and contains faults could be the areas most likely to suffer gross distortion when the magma is evacuated from the chamber. For the previous Application the balance of argument seemed to favour choosing the likely position for the start of an explosion as the most suitable position for the shaft and tube. In contrast, for the present Application the cutting of the shaft seems much less difficult than before, as does the installation of the tube, whereas the stability of the rock face now appears to be of much greater importance than before. Consequently at present the evacuation tube would be installed in one of the greatest thicknesses of the strongest rock structure, in a position where the structural geometry of the shaft, within itself, would be very stable.

With the above arguments, and with the position for the shaft chosen accordingly, it seems reasonable for present purposes to suppose that the shaft could support itself during the shaft cutting operation. It is assumed that the semi-liquid filler is used to reproduce the natural pressure and that any short term heating of the filler required during the cutting of the shaft is not going to be excessive for the structure of the rock face. The only support therefore provided beyond the accurate pressurization from the filler is the longer term supplementary support. That is supplied when the cutting of the shaft has been finished and the cutter removed. The longer term support could be in the form of a substantial steel shell as the basic support, with thermal insulation, cooling, heating, other services and suitable filler between itself and the rock face of the shaft, as well as between the shell support and the evacuation tube proper, all dependent on the general assessment of the requirement. It could be installed from the surface in the manner about to be described below for the main tube.

When the shaft has been cut in the manner described above and when the cutting gear is lifted out, the shaft would have been kept continuously filled with magma or sand. In a sense all would be in equilibrium, with no requirement for a cover at the top of the shaft. However, for subsequent purposes, and for suitable control, there may be an extension of the evacuation tube to a suitable height above the ordinary ground surface level, there may also be a suitable pressure tight cover with exit ducting and valves, and there may be suitable rapid access from an adjacent reservoir of hot degasified and cleansed magma or sand capable of rapid discharge in emergency or otherwise into the evacuation tube.

Installation of the evacuation tube, or, first, of the supplementary support structure for the rock face of the shaft, is then carried out as a reverse of the process of lifting out the cutting gear. Sections of the tube would be lowered through the pressure cover from a suitable structure. The weight would be relatively small because of the buoyancy, as well as because of any pressure within the pressure cover at the time. A sliding seal for the entry of the sections of tube would be provided if necessary at the pressure cover. Successive sections of the evacuation tube would be supplied on a suitable special railway from a remote construction or sub-assembly plant. Joining of the bottom of each new section to the top of the section just lowered would be performed at the support structure at the top of the shaft. The sections could be complete rings when leaving the remote construction or assembly plant.

The installation procedure would be reversible, so providing the inestimable advantage of being able to lift the evacuation tube and the shaft wall protection tube-type-lining for inspection, maintenance and modification. There would be fillers as appropriate, with temperature controls, in the spaces between the evacuation tube, the tube-type-lining, and the shaft rock face. The evacuation tube may itself be in more than one layer, in order to separate for freedom of thermal expansion the regions that are at various temperatures and that satisfy various aspects of the structural requirements.

Even with low melting point fillers of the types so far discussed the temperatures seem likely to be high enough to allow problems of thermal expansion. The present provisional suggestion is that the filler in the space between the evacuation tube and the basic structural shell of the rock face support would be maintained at a constant temperature suitable for allowing the various movements associated with installation and maintenance of the evacuation tube. All of the structural steel would probably be chosen and designed for at least that temperature. The filler between the rock face and the rock face support would be at that same temperature during installation and maintenance, but would be slowly changed for steady operation of the evacuation system to a temperature distribution acceptable to the rock face. During that change the temperature of the basic steel shell support for the rock face would be held close to steady—or as analysis indicated. However the surface structure of the support must be able to continue to provide support while changing in temperature with the rock face and filler. The suggestion accordingly is for a layer of insulation tiles to be attached to the basic support shell, with a layer of steel tiles outside the insulation and attached, through it, also to the basic support shell.

The fourth advantage from high temperature heating, relative to strong cooling, concerns power generation and is also discussed separately.

Power Generation

With high temperature heating the potential for power generation seems to be very large.

The high temperature of the magma when reaching ground level means that transfer of the heat to the boiler of a steam turbine could produce a good thermal efficiency. A conventional boiler with banks of boiler tubes could have difficulties. Consequently it could be an advantage to maintain the evacuation tube at a substantial pressure at ground level. That would allow direct contact between the magma from the tube and the water and steam for the turbine, preferably in contraflow, at sensibly the inlet working pressure of the heat engine. It seems to the writer that the potential power generation could then perhaps be so large as to contribute significantly to the costs of the magma evacuation. Conceivably also, it may contribute significantly to the prevention of the "greenhouse effect".

For the above effects of power generation to be significant as suggested, it would need to be argued that the magma flow rate appropriate for preventing the explosion of the supervolcano is large compared with the rate at which the magma is flowing naturally into the supervolcano. It may in fact be that the appropriate rate is not merely large, but very large, compared with the rate of entry, if it seemed advantageous to obtain a rapid initial drop in the level of magma in the chamber. That is an attractive argument, but it would be necessary to be satisfied that faulting around the edge of the "plug" of overlying rock, the plug that is holding the pressure in the magma chamber, could be adequately safeguarded, perhaps by suitable distribution of the degasified magma from the evacuation. As regards the greenhouse effect, there would be some carbon dioxide from the treatment plant, but it seems to the writer that it could be small compared with the average from current power production.

The heat transfer in contraflow between the magma and the water and steam may be easier if the magma had not disintegrated into gas and very small particles. A suitable high pressure for the heat transfer process should also be easier to achieve if the pressure in the tube had not been lowered in order that disintegration may occur. If, therefore, disintegration was prevented before starting the heat transfer, and if a good contraflow were achieved within the heat transfer, so that the magma left the heat transfer process pressurised and cold, but not disintegrated, then, if these conditions all held, it would be necessary to check that disintegration could still be safely initiated on the cold magma when the pressure were released.

For the use of the method of strong cooling the same overall heat flow could be available but its temperature would be lower and so the corresponding heat engine efficiency would be less. Also the power required to drive the evacuation system could be higher and the net power available could be more difficult to predict. The high temperature heating could therefore be much the more preferable.

An Array of Tubes Versus a Single Tube

In the previous discussion it was suggested that a large field such as Yellowstone may require an array of tubes, with the tubes at intervals of perhaps 1 to 2 km, in order to avoid some unspecified problem caused by the concentration of magma removal at a single tube. However, consideration since that discussion has emphasized that the magma within the magma chamber would probably "run" almost like water in a reservoir, because of its large size, so that from that point of view there would seem no advantage in using an array rather than a single tube. Moreover, the more recent consideration has emphasized also the importance of heat transfer and of flow dynamic losses in the evacuation system and the importance of keeping these items as small as is reasonably possible. That seems to indicate that each evacuation tube needs to be at a large scale. The large scale becomes appropriate for a single tube, but seems much less likely for an array of a very large number of tubes. Moreover the arguments in The Effect on Both Cutting of the Shaft, and the Installation of the Evacuation Tubes of the Concept of Applying High Temperature Heating to Magma, above, concerning the structural stability of the shaft would point to the importance of keeping shafts away from the structurally weaker areas of the rock overlying the magma chamber. At present, therefore, basically a single tube in any one field is the preferred solution, or as few tubes in excess of one as other requirements allow.

A Variation on the Design

In some situations a simpler type of evacuation tube may be possible.

As described above, it was emphasized that the evacuation tube at Yellowstone should probably be put at a position where there is a large thickness of good structural overlying rock. Nevertheless, in some circumstances it may be appropriate to put an evacuation tube where the overlying rock is thin. That could possibly allow the magma to reach the surface without an artificial drive and perhaps even with pressurization to prevent the magma gas coming out of solution. There could then be a very simple evacuation tube delivering the magma to a treatment plant. Even so, some of the techniques discussed above could speed up the delivery and maybe give a more economic system.

Example

A specific embodiment of the invention will now be described by way of example with reference to the accompanying drawing in which:—

Figure 2:
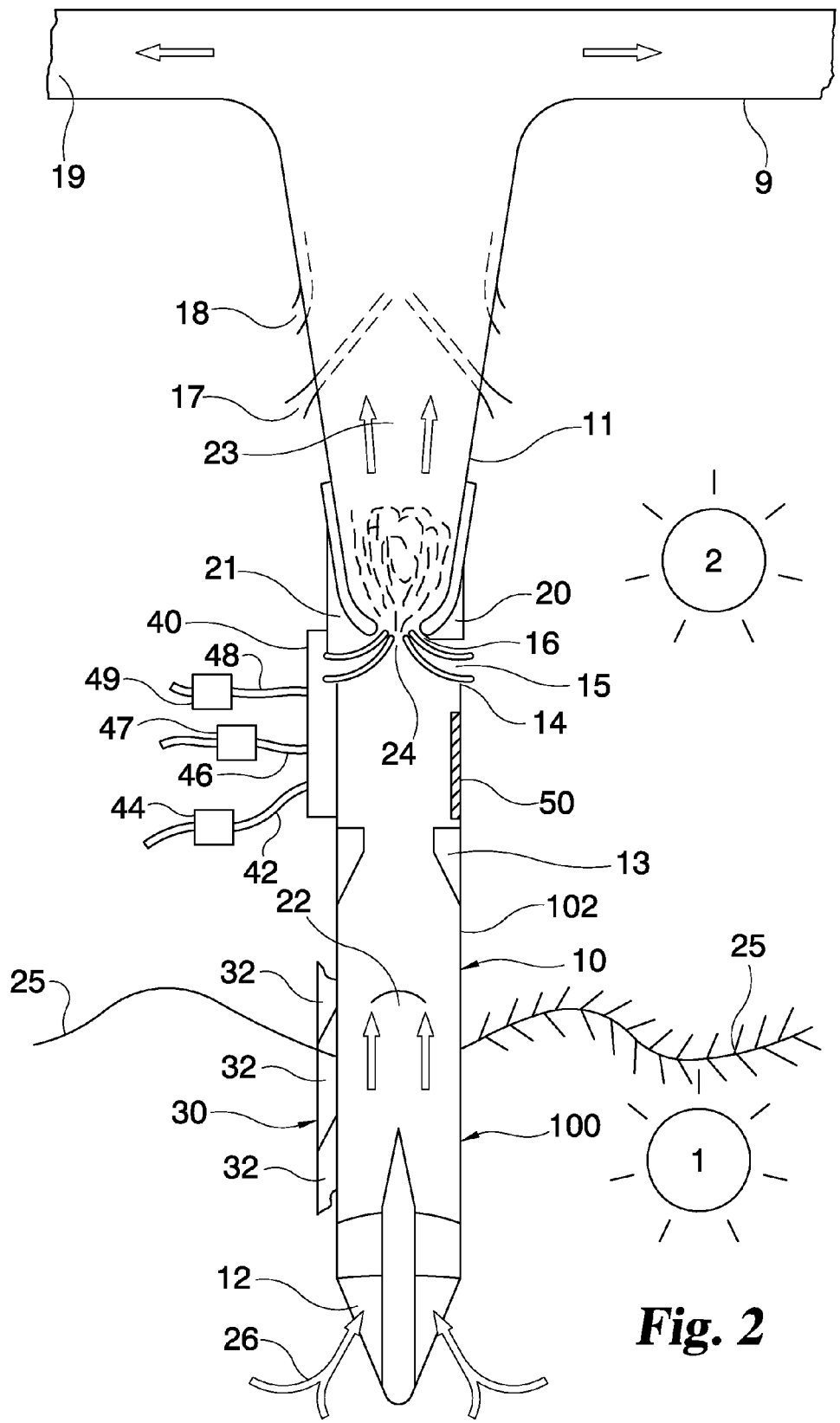
FIG. 2 is a cross-sectional view showing the use of an apparatus in accordance with one aspect of the present invention.

FIG. 1 shows the pressurization from the special heated filler allowing the shaft to be cut by milling cutter, both continuously and without further support for the shaft walls; and FIG. 2 shows the evacuation tube with means for heating some or all of the flow of hot volcanic magma.

In FIG. 1 the position 1 is in the magma chamber and position 2 in the overlying rock, with the interface represented at the wavy line between them. Item 3 is the special heated filler, filling and accurately pressurizing the space between the cutter column 4, the cutting gear 5 and 6, and the walls of the shaft as far as it has so far been cut. The filler is a clean type of sand of suitable density, treated with chemical additives to allow a semi-liquid filler, of reasonably low viscosity, at as low a temperature as is reasonably possible. The column carries temperature controls.

Item 5 is a radial arm carrying the milling cutters 6. Coolant and scavenging is provided locally at the cutters as required. Automatically adjusting shields prevent excessive mixing between the various materials. Mechanisms allow the cutter shafts to be moved radially along the arms and circumferentially with the arms. The arms can be moved vertically, both by large amounts, by moving the main column 4, and by small continuous movements, such as required for the cutter feed, by lowering the lower extension of column 4 by mechanisms inside 4. The accuracy of the direction in which the shaft is being cut is monitored by a sight line within the sight tube 7, using a suitable system. The control and stability of the column is through variable and retractable multiple guides and stabilisers such as indicated at 8. The lifting force required to hold the total column and cutter assembly in position is small, because of the large buoyancy provided by the dense heated filler 3. Buoyancy tanks containing air and water within column 4 continually adjust to provide a force in the direction of any immediate required movement. Suitably large overhead structures would be provided for assembling and maneuvering the whole; these could be arranged to be the same structures as used subsequently for the evacuation tube. A large heated reservoir for the filler is arranged for ordinary use as well as for possible emergency.

After completion of the shaft the heated filler 3 allows the column 4 and its equipment to be withdrawn and replaced by a shell for the semi-permanent supplementary support of the shaft walls. That arrangement is discussed briefly in Section 6.4 above. When the shell support is in position the same heated filler technique allows installation of the main evacuation tube, in sections, from the overhead structure. Subsequent inspection and maintenance both for the main evacuation tube and for the support shell for the shaft wall would likewise be carried out using the filler and the overhead structure.

FIG. 2 shows the main evacuation tube. The key for the numbers for FIG. 2 is as follows.

In FIG. 2 positions 1 and 2 are again in respectively the magma and in the overlying rock, with the wavy line 25 representing their interface. Ground level is indicated at item 9. The evacuation tube 100 has two regions, the lower region 10 and the upper region 11. Representative insulation material 30, illustratively shown as overlapping tiles 32, is shown as being located outside of the wall 102 of evacuation tube 100. The entry is item 12 at the lower end, 13 represents a staggered ring of vortex generators, 14 an upwardly inclined tangential "complex injection" of heating steam, discussed more fully below, around essentially the whole circumference, 15 represents a rather small number of small discrete nozzles, each ejecting hot water from the wall at 45 degrees upward, and with sufficient velocity for the water to reach the middle of the magma flow and to distribute itself, reasonably, through the flow, 50 represents a heating device, such as an electrical heater, for example, located within tube 100 and designed to heat the flow of magma, if necessary, while 16 is a complex injection of a power steam flow discussed below. Item 16 injects the steam tangentially upwards, around essentially the whole circumference. It provides the main power drive for the whole of the evacuation tube, as well as providing heat and stability. Items 17 and 18 are supplementary injections. Item 17 represents small water flows injected to near the middle of the flow. Item 18 is a full circumference complex injection of steam flow tangentially upwards. The exit passage at 19 leads to a pressurised purification plant and contra-flow heat exchanger, to drive a steam turbine. The heat exchanger is followed by pressure reduction of the magma and its suitable safe degasification. There could then be a removal of worthwhile minerals from the magma, prior to its being spread as ballast over suitable parts of the overlying rock. (The cleansing from the treatment plant is probably so thorough that the magma by then is too pure to be fertile, so perhaps a further process, an addition, would make it more welcome.) Item 20 is a water pump. The pump takes water from the coolant outlet of the upper part of the evacuation tube, 11, and further pressurises it, before passing it to the heater 21. The heater gives each water supply what is estimated to be its optimum temperature for its various successive usages, after taking into account any problem of differential temperature.

The "complex injection" of the steam flows at 14, 16 and 18 is obtained by supplying water, air and fuel, either liquid or gas, to a rather large number of combustion chamber, one of which is illustratively shown as combustion chamber 40. The combustion chambers are small compared with the diameter of the evacuation tube. The combustion chambers are set in a ring, at the bend, within, but reaching to the exit from, the passage indicated at 14, 16 or 18. The passage is a complete circumferential passage, other than for vertical structural walls that are set radially, and for the structure needed to control the various flows and the combustion. Each of the small combustion chambers is rather like the combustion chamber in liquid fuel rockets. The three supplies of water, air and fuel are first used for cooling the wall of the chamber, either externally, or by flowing through holes within the thickness of the wall. The three supplies are then pumped into the chamber, where the pressure is maintained at a high level by the rocket type combustion process. FIG. 2 illustratively shows water being provided to combustion chamber 40 via pipe or tubing 42 by pump 44, air being provided to chamber 40 via pipe or tubing 46 by a pump 47, and fuel being provided to chamber 40 via pipe or tubing 48 by a pump 49. After pumping into the chamber the air and fuel are controlled to mix and burn centrally in the chamber, while the water is controlled to provide film cooling over the internal chamber surface of the wall. After the combustion the various flows within the chamber contract to an exit nozzle. The total length of the chamber, including the part containing the flow to the exit nozzle, is made sufficient for sufficient of the water film to have evaporated to produce the required mass flow of steam. At that stage the total flow from the chamber issues at very high mean temperature and at high velocity. The velocity may not be supersonic, as the static pressure at the exit from the chamber is very high, relative to the ordinary atmosphere at ground surface level. That is because of the requirement that the delivery to the ground level surface treatment plant is at turbine inlet pressure.

The "complex injection" of the steam flows at 14, 16 and 18 is obtained by supplying water, air and fuel, either liquid or gas, to a rather large number of combustion chambers. The combustion chambers are small compared with the diameter of the evacuation tube. The combustion chambers are set in a ring, at the bend, within, but reaching to the exit from, the passage indicated at 14, 16 or 18. The passage is a complete circumferential passage, other than for vertical structural walls that are set radially, and for the structure needed to control the various flows and the combustion. Each of the small combustion chambers is rather like the combustion chamber in liquid fuel rockets. The three supplies of water, air and fuel are first used for cooling the wall of the chamber, either externally, or by flowing through holes within the thickness of the wall. The three supplies are then pumped into the chamber, where the pressure is maintained at a high level by the rocket type combustion process. After pumping into the chamber the air and fuel are controlled to mix and burn centrally in the chamber, while the water is controlled to provide film cooling over the internal chamber surface of the wall. After the combustion the various flows within the chamber contract to an exit nozzle. The total length of the chamber, including the part containing the flow to the exit nozzle, is made sufficient for sufficient of the water film to have evaporated to produce the required mass flow of steam. At that stage the total flow from the chamber issues at very high mean temperature and at high velocity. The velocity may not be supersonic, as the static pressure at the exit from the chamber is very high, relative to the ordinary atmosphere at ground surface level. That is because of the requirement that the delivery to the ground level surface treatment plant is at turbine inlet pressure.

The combustion of the air and hydrocarbon, as is rather assumed to be used above, would cause a slight embarrassment at the exit from the condenser of the steam turbine, as it would produce some non-steam gas content. The amount may be small enough merely to extract it with a small compressor, without significant effect on the overall performance.

The remainder of the key for the numbers in FIG. 2 is as follows. Item 22 is the magma flow in the lower part of the evacuation tube 10, 23 is the mixed flow of magma, steam and the products of combustion in the upper part of the evacuation tube 11, 24 is the throat between the two parts 10 and 11 of the evacuation tube, 25 is the interface between the magma chamber 1 and the overlying rock 2, and the entry flow into the entry 12 at the bottom of the tube is 26.

The design of the evacuation tube in two parts is in order to be able to accept the extreme conditions of pressure and temperature surrounding the lower part of the tube, while being able to provide a range of conditions inside the upper part of the tube. The lower part of the evacuation tube 10 has been designed for near zero pressure loading across its wall. To that end, the velocity of the magma flow 22 has been kept as low as possible. In addition, the entry 12 has been made as open as possible. The lower part of the entry structure at 12 has the possibility of including some slim debris guards and those, together with slim cross plates to the centre-body, are intended also to remove any swirl in the flow. Then, provided there is not a lot of debris, the flow 26 and 22 should require only a minimum of pressure drop. At the position 13, it is likely that a temperature profile will have developed, so that the vortex generators 13 bring the hotter magma from the middle of the flow to be close to the wall, in order to reduce the viscosity at the wall. The stagger of the row of vortex generators is introduced as that seemed likely to ease the capture of the magma that is flowing close to the centerline.

The arrangement in FIG. 2 implies that, with the vortex generators, the viscosity at the wall remains sufficiently low as far as the heating slot 14, discussed above. If in fact the viscosity became too high before slot 14, the heating would be introduced earlier, accordingly, but at the shallowest possible position.

The throat, 24, limits the flow, for given pressures above the throat, and prevents high internal velocities and damagingly low internal pressures penetrating into the lower part of the tube 10 below the throat.

The sharp expansion immediately after the throat allows the flow to be set up in the upper part of the evacuation tube 11. The jets of hot water from the small number of small discrete nozzles 15 have sufficient pressure to penetrate and spread through the magma flow, which would be coming as a jet from the throat 24 immediately below. The static pressure in the tube at this position just above the throat would be set at a value somewhat larger than at the ground level surface at the entry to the turbine, but not very much higher. Consequently, the sudden contact between the hot water and the much hotter magma would cause the spreading jets of hot water to burst into steam. That would break up the magma jet into liquid fragments and spread them across the cross-section of the tube. Mixing would therefore follow between the flow of magma fragments and the very hot steam flow that is coming from the complex injection 16, discussed above.

The region immediately above the throat is therefore a region where the magma flow breaks up into liquid fragments and mixes with steam. Gravity then causes retardation of the magma fragments, until the drag from the steam carries the magma fragments upwards. If then, there were a conventional velocity profile for the steam, the magma fragments could be expected to be thrown to the wall by the turbulence and deposited on to the wall. In the present situation, however, the steam velocity will be rather low in the middle of the flow and very high near the wall. The tendency for the magma fragments to be flung radially outwards will be opposed by the high velocities and high turbulence of the high velocity steam flow close to the wall, as these will tend to cause fragments of magma to be sent radially inwards. Moreover, that situation will tend to persist in the ensuing favourable pressure gradient and high initial central gravity drag. Consequently the flow will tend to be stable as regards the magma being kept away from the wall.

Furthermore, the high temperatures at the wall will give low viscosity in the magma which does actually reach the wall. Consequently the high velocity and high temperature steam flow adjacent to the wall would drive the surface of such magma deposits into waves, and then cause "breakers", and then lift off all the deposit. There would therefore be stability, also, in keeping the wall clear of magma deposits.

There would be a gradual deterioration in the flow as a result of wall friction and heat loss and these are offset, to give stability all the way to the surface, by supplementary injections such as indicated at items 17 and 18.

The wall divergence in the mixing region is set as a first approximation to give a constant static pressure in the mixing region. After the mixing there may be some modest diffusion and then an approximately constant modest velocity to the surface. The constant velocity would be maintained against gravity and wall friction by a gradual fall in static pressure. The divergence in the tube flow to the surface is largely to accommodate the increasing specific volume of the carrier gas as the static pressure is reduced.

At start-up an alternative route at the ground level surface would allow the flow to exhaust from the tube at sensibly atmospheric pressure. The supplementary injections such as 17 and 18 mentioned above then particularly help to start the flow. The hydraulic pressure statically at start-up will be much lower at 17 and 18 than at positions 15 and 16. Consequently it would be easier to set up a steam flow at 17 and 18 and the reduction in static pressure as a result would lower the static pressure at 15 and 16, so giving the start-up.

Given that the flow in the upper part 11 of the evacuation tube is broadly a flow of steam of modest velocity and low loss, the driving pressure for the magma at the throat is approximately equal to the pressure head given by the average surface altitude of the overlying rock, relative to the altitude of the throat, with appropriate corrections for density, for some flow losses, for the gravity load on the magma fragments in the upper part of the tube, and for the pressure at entry to the turbine. The altitude depth of the throat is therefore made just sufficiently great for the magma flow at the throat to be reliably and adequately strong, with margin, when all these factors are taken into account.

All parts of the tube exposed to the magma are heavily insulated. Excellent insulation would be needed in order to ease the structural design of the tube, excellent insulation would also be needed in order to prevent excessive heat being transferred to the rock walls of the shaft and to the region of the cooler magma at the top of the magma chamber, and it would further be needed to prevent the fuel usage required for the main magma heating being very large. Good insulation would be much more likely to be practicable when working at a large scale, such as for a rapid magma evacuation rate from a single evacuation tube. The insulation may be formed from very large overlapping tiles, in order to allow a certain amount of thermal movement without cracking. The overlap from any tile would be arranged to protect the fixing of the adjacent tile. The gaps between adjacent tiles in positions remote from the magma could maybe be filled with a special low melting point filler. And possibly such gaps should be vented to the magma flow, with the vents filled with the special filler. Steadiness of the operating conditions is probably important for achieving good insulation. Also, the fact that the heated filler technique for the main shaft allows the whole installation to be lifted out for inspection and maintenance is probably very important for achieving good insulation. These features are all included in the build and operation of the evacuation tube of FIGS. 1 and 2.

The invention claimed is:

1. Apparatus for the prevention of explosions from supervolcanoes and volcanoes comprising: a magma evacuation tube for evacuating a volcanic magma flow, said tube leaving a wall defining inner and outer surfaces, a lower end located in said magma and an upper end for discharge of said magma, a throat intermediate said ends, and one or more regions of divergence above said throat, wherein said tube incorporates means located at positions along said tube for heating at least some of said volcanic magma flow, and wherein said tube incorporates means located along said tube for insulating said wall of said tube from said magma flow, and wherein said tube incorporates means located along said tube for cooling said wall of said tube and wherein a large reservoir of low melting point glass is connected to said tube by means allowing a controlled discharge of said low melting point glass into said tube to block said tube.

2. The apparatus as claimed in claim 1, wherein said means for heating at least some of said volcanic magma flow is situated at the edge of, or within, the interior of said tube.

3. The apparatus as claimed in claim 1, wherein said means of heating at least some of said magma flow is located at a distance from said inner surface of said wall that is no more than 10% of the total distance from said inner surface to the centerline of said tube.

4. The apparatus as claimed in claim 1, wherein said means of heating at least some of said magma flow comprises at least one of a combustion chamber, a combustion torch, an electrical heater, and a means for providing a flow of gas or liquid.

5. The apparatus as claimed in claim 1, wherein said heating means comprises at least one combustion chamber and a means for providing air and fuel to said at least one combustion chamber.

6. The apparatus as claimed in claim 5 comprising means for providing water to said at least one combustion chamber.

7. The apparatus as claimed in claim 6 wherein said means for providing air and fuel, and said means for providing water to said at least one combustion chamber comprises at least one pump.

8. The apparatus as claimed in claim 1, further comprising an injection jet disposed adjacent to said wall of said tube.

9. The apparatus as claimed in claim 1, further comprising one or more nozzles disposed in said wall of said tube.

10. The apparatus as claimed in claim 1, wherein said tube incorporates at least one divergent path immediately after said throat.

11. The apparatus as claimed in claim 1, wherein one or more means of heating are situated immediately after said throat.

12. The apparatus as claimed in claim 1, wherein cooling water is ejected from one of more nozzles in said wall of said tube immediately after said throat.

13. The apparatus as claimed in claim 1, wherein said means for insulating comprises overlapping files.

14. The apparatus as claimed in claim 13 wherein spaces between said overlapping tiles is filled with a filler.

15. The apparatus as claimed in claim 14 wherein said filler is chosen to have a melting point above the melting point of said magma.

16. The apparatus as claimed in claim 15 wherein said filler filled spaces are vented to said magma flow by way of filler filled vents.

17. The apparatus as claimed in claim 1 further comprising a heat engine and wherein said magma coming from the exit of said tube is delivered to said heat engine.

18. The apparatus as claimed in claim 17 wherein said heat engine is a steam turbine.

19. The apparatus as; claimed in claim 18 wherein said magma is delivered from said tube at the entry pressure of said steam turbine.

20. The apparatus as claimed in claim 19 wherein a heat exchanger gives said magma direct contact with water and steam for said turbine at said turbine entry pressure.

21. The apparatus as claimed in claim 20 wherein said heat exchanger operates with contraflow.

22. The apparatus as claimed in claim 21 wherein said magma is degasified after it has left said heat exchanger and not before.

23. The apparatus as claimed in claim 1, further comprising means for controlling the flow of said magma comprising means for centrally cooling said magma flow.

24. The apparatus as claimed in claim 23, wherein said means for centrally cooling said magma flow comprises water jets provided at said wall of said tube.

25. Apparatus for the prevention of explosions from supervolcanoes and volcanoes comprising: a magma evacuation tube for evacuating a volcanic magma flow, said tube having a wall defining inner and outer surfaces, a lower end located in said magma and an upper end for discharge of said magma, a throat intermediate said ends, and one or more regions of divergence above said throat, wherein said tube incorporates means located at positions along said tube for heating at least some of said volcanic magma flow, and wherein said tube incorporates means located along said tube for insulating said wall of said tube from said magma flow, and wherein said tube incorporates means located along said tube for cooling said wall of said tube and wherein a large reservoir of degasified magma is connected to said tube by means allowing a controlled discharge of said degasified magma into said tube to block said tube.

\* \* \* \* \*

UNITED STATES PATENT AND TRADEMARK OFFICE
CERTIFICATE OF CORRECTION

| | | |
|---|---|---|
| PATENT NO. | : 7,284,931 B2 | Page 1 of 1 |
| APPLICATION NO. | : 10/230549 | |
| DATED | : October 23, 2007 | |
| INVENTOR(S) | : Stratford | |

It is certified that error appears in the above-identified patent and that said Letters Patent is hereby corrected as shown below:

Title Page, Item (75) Inventors:
Please correct the inventor's address to read as follows:
--40 Field Rise, Littleover, Derby DE23 1DE (GB)--

Col. 17, line 57, replace "leaving" with --having--.

Col. 18, line 39, replace the words "one of" with --one or--.

Col. 18, line 42, replace the last word "files" with --tiles--.

Signed and Sealed this

Sixth Day of May, 2008

JON W. DUDAS
*Director of the United States Patent and Trademark Office*